(12) United States Patent
Pan

(10) Patent No.: US 7,992,807 B2
(45) Date of Patent: Aug. 9, 2011

(54) WATER OUTLET CONTROL DEVICE OF SHOWER SPRAY NOZZLE

(76) Inventor: Yaozhao Pan, Cixi (CN)

( * ) Notice: Subject to any disclaimer, the term of this patent is extended or adjusted under 35 U.S.C. 154(b) by 369 days.

(21) Appl. No.: 12/087,900

(22) PCT Filed: Apr. 13, 2006

(86) PCT No.: PCT/CN2006/000660
§ 371 (c)(1),
(2), (4) Date: Jul. 17, 2008

(87) PCT Pub. No.: WO2007/082418
PCT Pub. Date: Jul. 26, 2007

(65) Prior Publication Data
US 2010/0301141 A1      Dec. 2, 2010

(30) Foreign Application Priority Data

Jan. 17, 2006    (CN) .......................... 2006 1 0049163

(51) Int. Cl.
*B05B 1/18*         (2006.01)
*B05B 1/16*         (2006.01)

(52) U.S. Cl. ........ 239/449; 239/396; 239/397; 239/447; 239/525; 239/559; 239/567

(58) Field of Classification Search .................. 239/390, 239/396, 397, 436, 442–444, 446–449, 525, 239/548, 558, 559, 562, 567
See application file for complete search history.

(56) References Cited

U.S. PATENT DOCUMENTS

| 5,427,318 | A | 6/1995 | Lee |
| 5,433,384 | A | 7/1995 | Chan et al. |
| 5,476,225 | A | 12/1995 | Chan |

(Continued)

FOREIGN PATENT DOCUMENTS

CN          1127678         7/1996

(Continued)

OTHER PUBLICATIONS

International Search Report dated Nov. 16, 2006.

*Primary Examiner* — Darren W Gorman
(74) *Attorney, Agent, or Firm* — Jacobson Holman PLLC

(57) ABSTRACT

A mechanism of controlling water outflow of shower is provided in the casing of shower. The water outlet of the mechanism is aligned with the water outlet of shower. The mechanism of controlling water outflow comprises inner sealing shell, outer sealing shell, and an intermediate cavity defined between the inner sealing shell and the outer sealing shell. A water outflow cavity is formed between outer sealing shell and water outflow disc. The intermediate cavity communicates with intake channel of shower. The mechanism of controlling water outlet also comprises separating sealing pad inside the intermediate cavity, with one side sticked to the water outflow disc of outer sealing shell and the other side sticked to valve elements. The intermediate cavity comprises the inner cavity and outer cavity. The inner cavity communicates with water outflow cavity through the first small hole and with outer cavity through a through-hole. The intake channel communicates with outer cavity. The small hole matches with a mobile sealing pad that connects the button kit that controls the sealing pad to separate or contact the small hole. This invention can realize different effects of water outflow, easy operation handle and longer service life.

2 Claims, 4 Drawing Sheets

U.S. PATENT DOCUMENTS

| | | | | |
|---|---|---|---|---|
| 6,145,757 A * | 11/2000 | Knapp | | 239/443 |
| 6,869,030 B2 * | 3/2005 | Blessing et al. | | 239/394 |
| 7,100,845 B1 * | 9/2006 | Hsieh | | 239/447 |
| 7,303,151 B2 * | 12/2007 | Wu | | 239/447 |
| 2004/0217209 A1 * | 11/2004 | Bui | | 239/548 |

FOREIGN PATENT DOCUMENTS

| | | |
|---|---|---|
| CN | 1127679 | 7/1996 |
| CN | 1333706 | 1/2002 |
| DE | 20 2005 008 082 | 8/2005 |
| WO | WO 00/12221 | 3/2000 |

* cited by examiner

WATER OUTLET CONTROL DEVICE OF SHOWER SPRAY NOZZLE

This is a national stage of PCT/CN2006/000660 filed Apr. 13, 2006 and published in Chinese.

FIELD OF THE INVENTION

This invention relates to a mechanism of controlling water outflow of shower.

DESCRIPTION OF THE PRIOR ART

The mechanism of controlling water outflow of current showers needs simultaneous operation with both hands to rotate the head of shower for realizing different functions of water outlet, featuring poor maneuverability and short service life.

The Chinese patent CN133370A "Multifunctional Shower" discloses a shower that can guide water running, featuring the connection between water inlet path and mode selector and the connection between multiple water outlet paths and mode selector. The invention is provided with multiple mode channels, mode output holes and the valve arms controlled by multiple cam shafts in valve kit to realize the interchange of multiple spraying modes. However, water pressure directly acts to the controlling kit in the cavity and affects the service life of shower; Being also complex in structure and high in cost, the invention cannot be widely applied.

Not only the deficiencies of no separation between on-off valve and water, less water pressure resistance and short service life exist in the prior art, but also heavy hand power is needed and operation is not convenient during mode change for different functions of water outlet.

SUMMARY OF THE INVENTION

In order to overcome the shortcomings of poor maneuverability of shower outlet functions, failing to easily operate with single hand and short service life, the present invention provides a mechanism of controlling water outflow of shower featuring convenient operation, changing different functions of water outlet with single hand, better operation handle and longer service life.

The technical solution of this invention to the problem is:

A mechanism of controlling water outflow of shower is provided in the casing of shower. The water outlet of the mechanism is aligned with the water outlet of shower. The mechanism of controlling water outflow comprises inner sealing shell, outer sealing shell, and an intermediate cavity defined between the inner sealing shell and the outer sealing shell. A water outflow cavity is formed between outer sealing shell and water outflow disc. The intermediate cavity communicates with intake channel of shower.

The mechanism of controlling water outlet also comprises separating sealing pad inside the intermediate cavity, with one side sticked to the water outflow disc of outer sealing shell and the other side sticked to valve elements. The intermediate cavity comprises the inner cavity in the inner side of separating sealing pad and outer cavity in the outer side of separating sealing pad. The inner cavity communicates with water outflow cavity through the first small hole and with outer cavity through a through-hole. The intake channel communicates with outer cavity. The small hole matches with a mobile sealing pad that connects the button kit that controls the sealing pad to separate or contact the small hole.

Further, the valve elements comprise the first valve element and the second valve element. The inner cavity comprises the first inner cavity and the second inner cavity isolated each other. The water outflow cavity comprises the first water outflow cavity and the second water outflow cavity isolated each other. The first water outflow cavity communicates with the first water outlet, while the second water outflow cavity communicates with the second water outlet.

The first inner cavity communicates with the first outer cavity through the first small hole, and communicates with outer cavity through through-hole. The first small hole matches with the first mobile sealing pad that connects the first button kit that controls the sealing pad to separate or contact the small hole.

The second inner cavity communicates with the second water outflow cavity through the second small hole, and communicates with outer cavity through through-hole. The second small hole matches with the second sealing pad that connects the second button kit that controls the sealing pad to separate or contact the small hole.

Further more, the first button kit comprises a controlled magnet, a spring and an active magnet. The controlled magnet is fixedly coupled with mobile sealing pad, and can be freely invaginated inside the first sliding groove of inner sealing shell. The spring sticks tightly the place between the controlled magnet and the bottom of the sliding groove. The active magnet matches with the controlled magnet.

A magnetic slideway is provided inside the outer shell and located in the outside of inner sealing shell. The active magnet is located inside magnetic slideway and is coupled with switch of the shower.

Still further more, the first button kit comprises the first controlled magnet, the first spring and an active magnet. The first controlled magnet is fixedly coupled with the first mobile sealing pad, and can be freely invaginated inside the first sliding groove of inner sealing shell. The first spring sticks tightly the place between the first controlled magnet and the bottom of the first sliding groove. The active magnet matches with the first controlled magnet.

The second button kit comprises the second controlled magnet and the second spring. The second controlled magnet is coupled fixedly with the second sealing pad, and freely invaginated inside the second sliding groove of inner sealing shell. The second spring sticks tightly the place between the second controlled magnet and the bottom of the second sliding groove. The active magnet matches with the second controlled magnet.

A magnetic slideway is provided inside the outer shell and located in the outside of inner sealing shell. The active magnet is located is located inside magnetic slideway and is coupled with switch of the shower. The switch comprises stop location, the first location to align the active magnet with the first controlled magnet, and the second location to align the active magnet with the second controlled magnet.

If the inner cavity is divided into N cavities and is provided with N button kits, N different effects of water outflow form will be produced. Various effects of water outflow can be combined into more complicated effects of water outflow.

The beneficial effects of the present invention mainly are: 1. realizing different effects of water outflow; 2. change control mechanism completely isolated from inner device and water, water pressure resistance significantly strengthened, and service life prolonged correspondingly; 3. better operation handle at changing different functions of water outflow with single hand, automatic aligning, and easier operation; 4. with strong magnetic parts, this inventions produces water magnetization to benefit health.

DETAILED DESCRIPTION

Reference will now be made in greater detail to exemplary embodiments of the invention with reference to the accompanying drawings.

Figure 1:
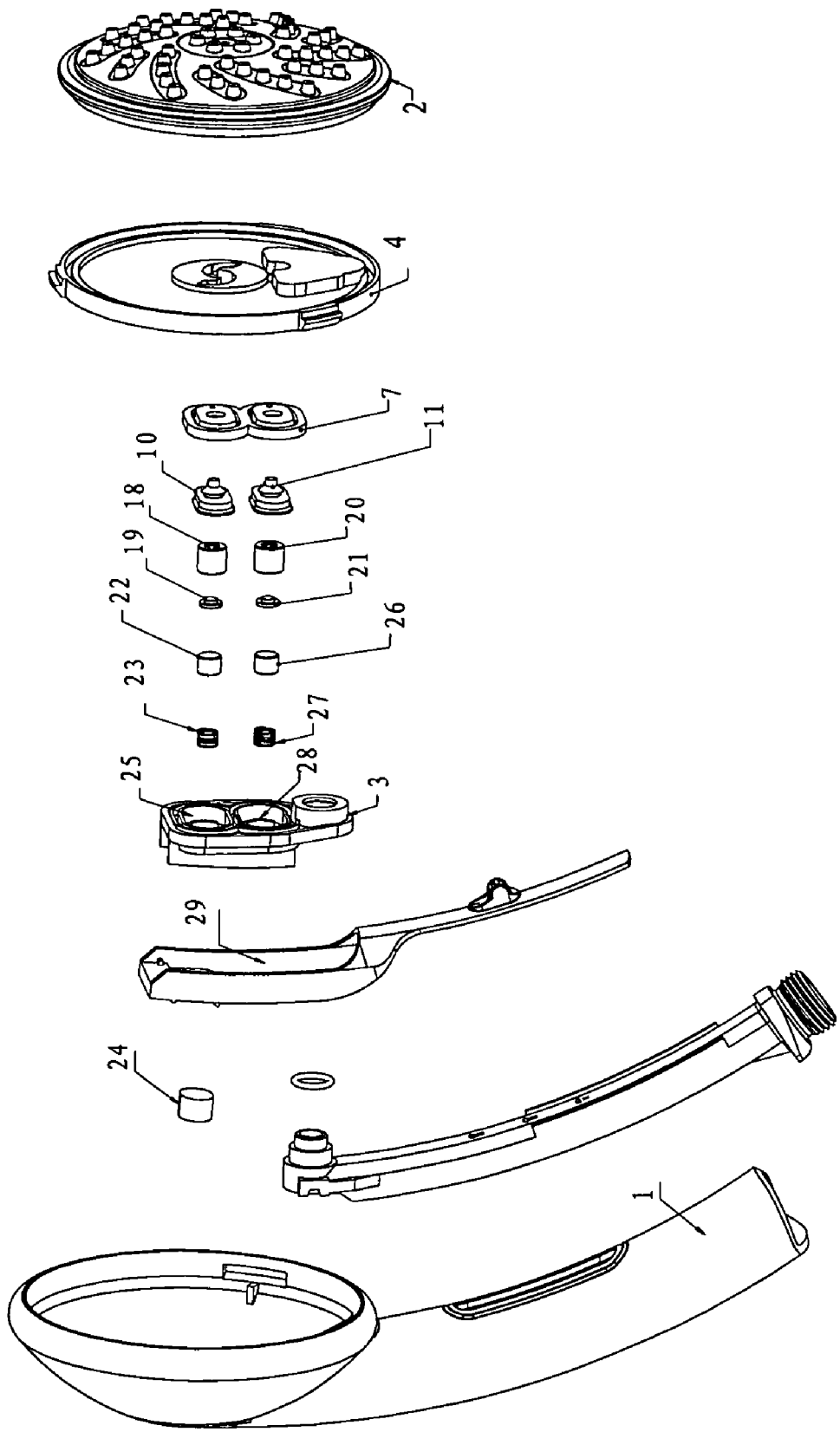
FIG. 1 is an exploded view showing mechanism of controlling water outflow of shower.
Figure 2:
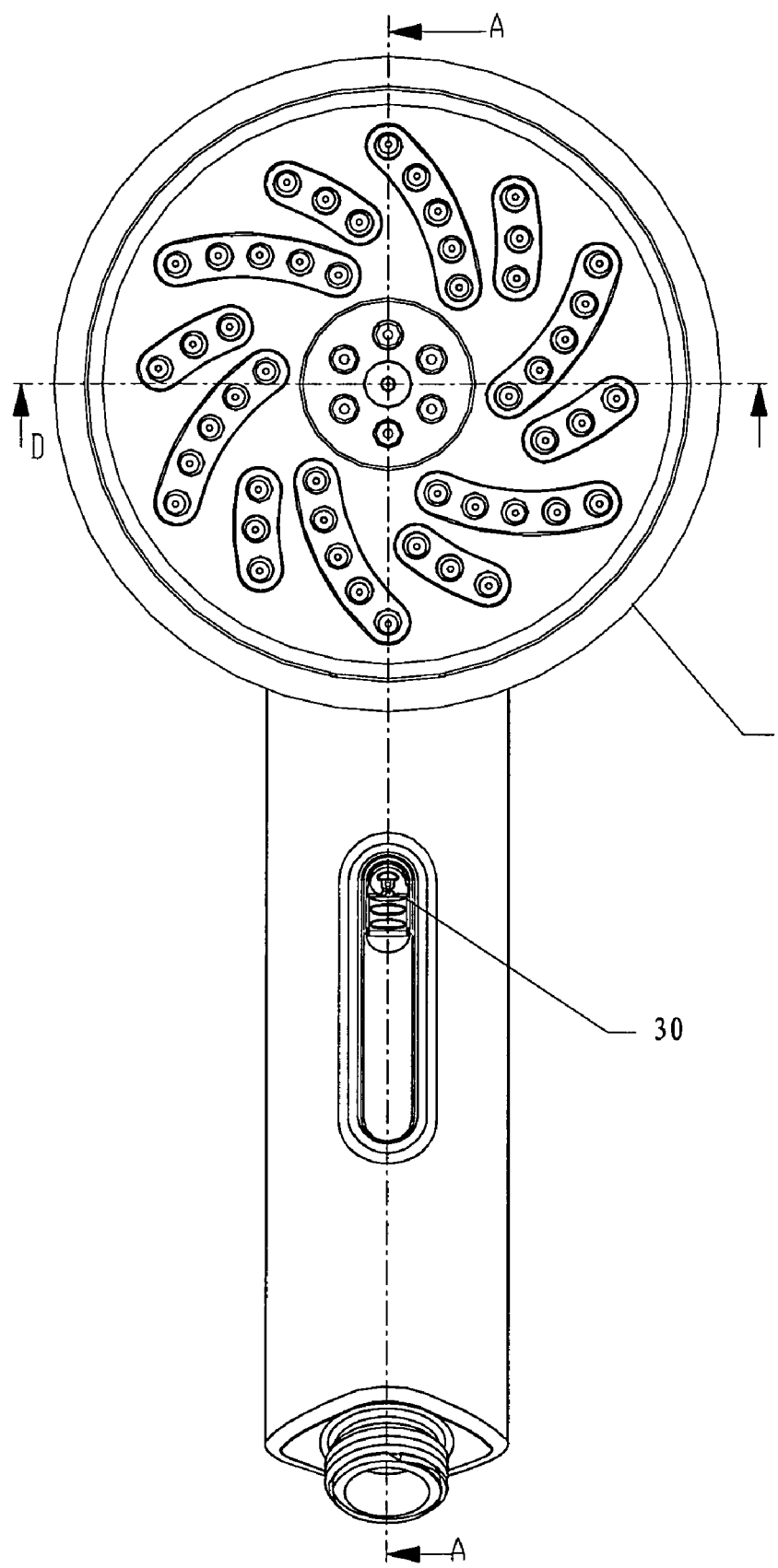
FIG. 2 is a schematic view of front structure of shower.
Figure 3:
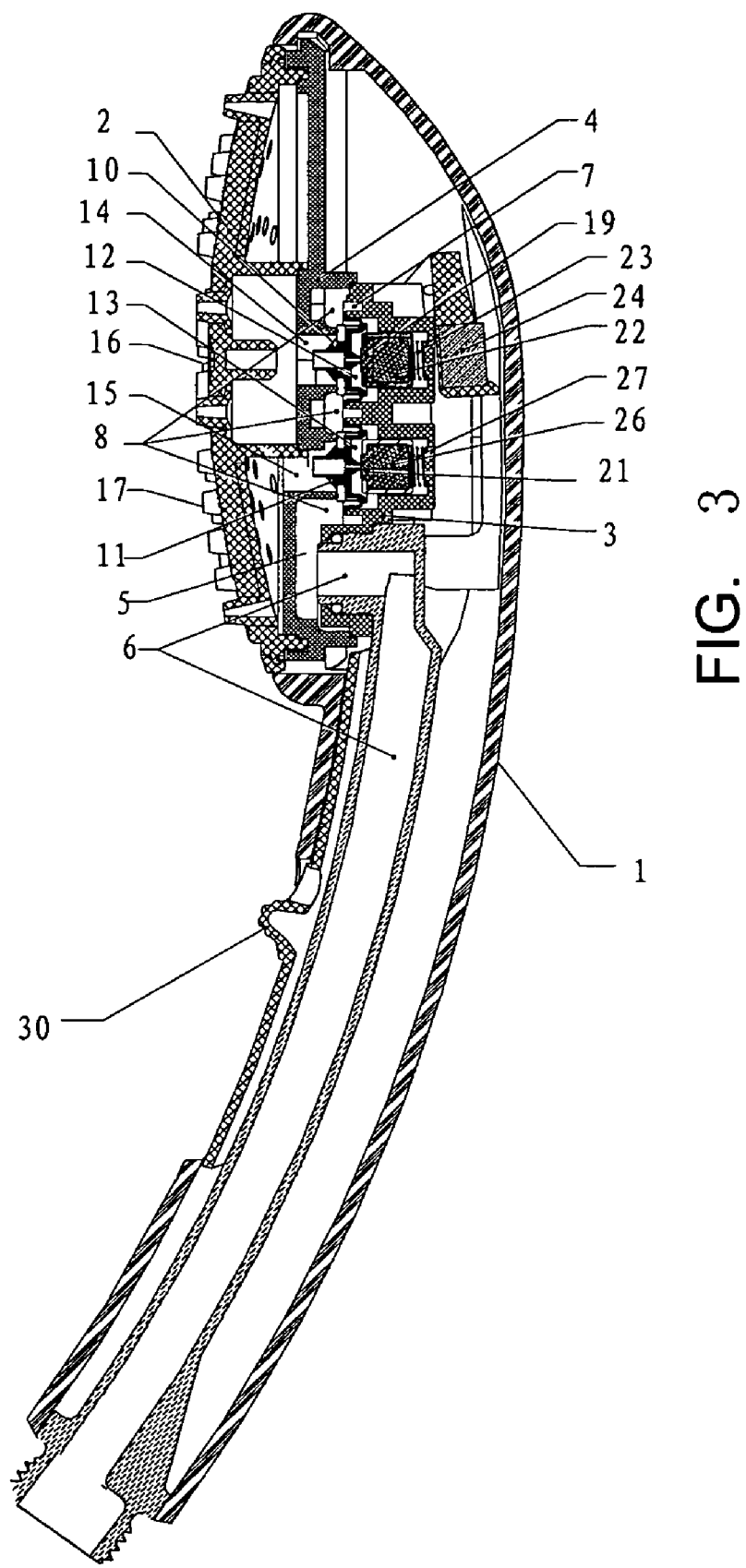
FIG. 3 is a sectional view cut along the A-A line of FIG. 2.
Figure 4:
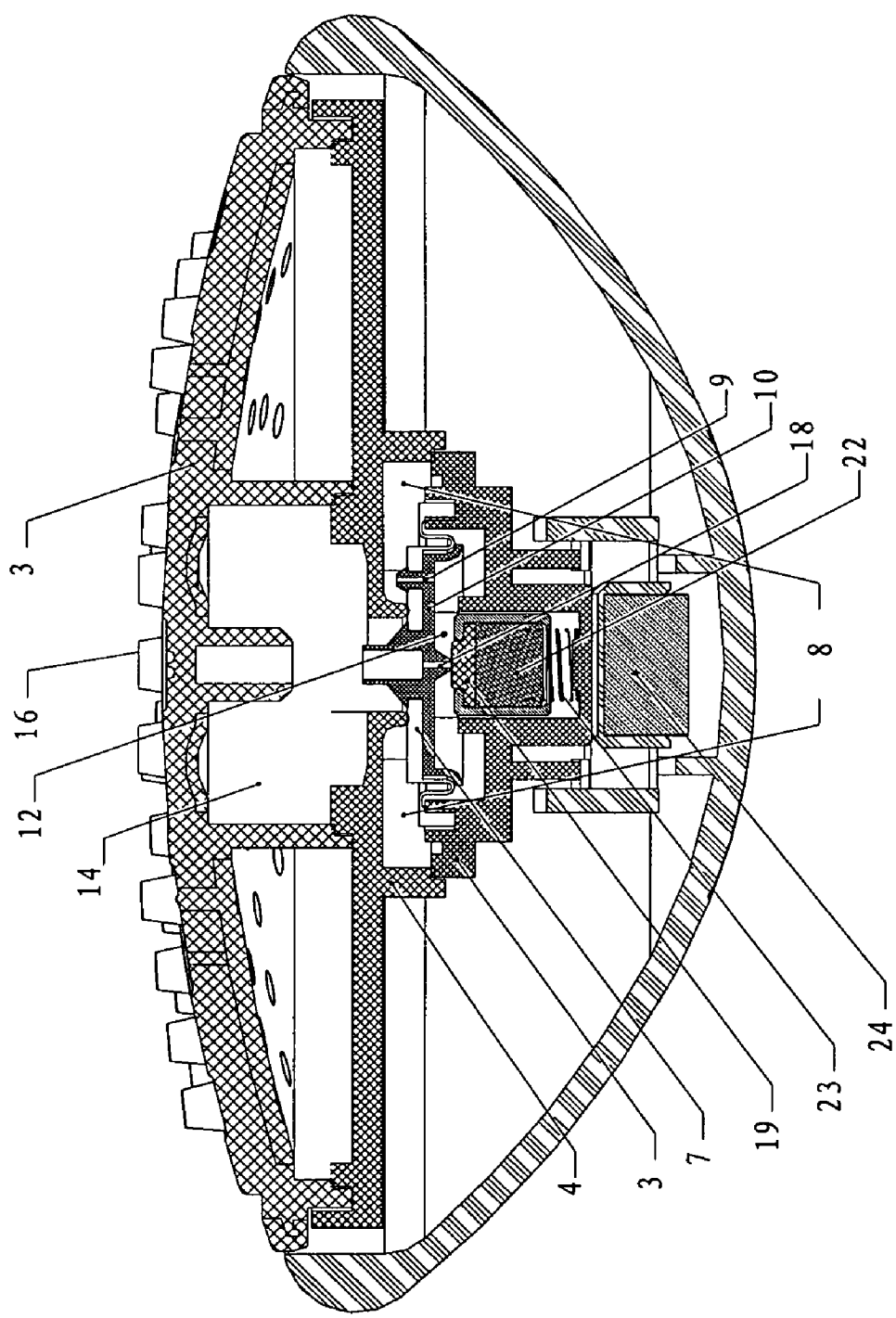
FIG. 4 is an enlarged sectional view cut along the D-D line of FIG. 2.

As shown in FIG. 1 through 4, a mechanism of controlling water outflow of shower is provided in casing 1 of the shower. The water outlet of the mechanism aligns with water outflow disc 2. The mechanism of controlling water outflow comprises an inner sealing shell 3, an outer sealing shell 4 and an intermediate cavity 5 defined between inner sealing shell 3 and outer sealing shell 4. A water outflow cavity is formed between outer sealing shell 4 and water outflow disc 2. The intermediate cavity 5 communicates with intake channel 6. The mechanism of controlling water outflow also comprises separating sealing pad 7 inside the intermediate cavity 5, with one side sticked to the water outflow disc of outer sealing shell 4 and the other side sticked to valve elements. The intermediate cavity 5 comprises the inner cavity in the inner side of separating sealing pad and outer cavity 8 in the outer side of separating sealing pad. The inner cavity communicates with water outflow cavity through small holes. The inner cavity communicates with outer cavity 8 through through-hole 9. Intake channel 6 communicates with outer cavity 8. The small hole matches with a mobile sealing pad that connects the button kit that controls the sealing pad to separate or contact the small hole.

The valve elements comprise the first valve element 10 and the second valve element 11. The inner cavity comprises the first inner cavity 12 and the second inner cavity 13 isolated each other. The water outflow cavity comprises the first water outflow cavity 14 and the second water outflow cavity 15 isolated each other. The first water outflow cavity 14 communicates with the first water outlet 16, while the second water outflow cavity 15 communicates with the second water outlet 17. The first inner cavity 12 communicates with the first water outflow cavity 14 through the first small hole 18, and communicates with outer cavity 8 through through-hole 9. The first small hole 18 matches with the first mobile sealing pad 19 that connects the first button kit that controls the sealing pad 19 to separate or contact small hole 18. The second inner cavity 13 communicates with the second water outflow cavity 15 through the second small hole 20, and communicates with outer cavity 8 through through-hole 9. The second small hole 20 matches with the second sealing pad 21 that connects the second button kit that controls the sealing pad 21 to separate or contact the second small hole 20.

The first button kit comprises the first controlled magnet 22, the first spring 23 and active magnet 24. The first controlled magnet 22 is fixedly coupled with the first mobile sealing pad 19, and can be freely invaginated inside the first sliding groove 25 of inner sealing shell 3. The first spring 23 sticks tightly the place between the first controlled magnet 22 and the bottom of the first sliding groove 25. The active magnet 24 matches with the first controlled magnet 22. The second button kit comprises the second controlled magnet 26 and the second spring 27. The second controlled magnet 26 is coupled fixedly with the second sealing pad 21, and freely invaginated inside the second sliding groove 28 of inner sealing shell 3. The second spring 27 sticks tightly the place between the second controlled magnet 26 and the bottom of the second sliding groove 28. The active magnet 24 matches with the second controlled magnet 26. A magnetic slideway 29 is provided inside the outer shell and located in the outside of inner sealing shell 3. The active magnet 24 is located inside magnetic slideway 29 and is coupled with switch 30 of the shower. The switch 30 comprises stop location, the first location to align active magnet 24 with the first controlled magnet 22, and the second location to align active magnet 24 with the second controlled magnet 26. The sealing pad uses rubber pad.

The work flow chart of this example is as follow:

Open water flow: water flows into outer cavity 8 through intake channel 6 and then the first inner cavity 12; when active magnet 24 moves to the end surface of the first controlled magnet 22, two magnets will produce magnetism and pull the first mobile sealing pad 19 to move and open the first small hole 18 through which water in the first inner cavity 12 flows out and reduces it pressure; when water pressure is less than the pressure in outer cavity 8, the water in first small hole 18 will press off separating sealing pad 7 and flow into the first water outflow cavity 14 from the clearance between separating sealing pad 7 and outer sealing shell 4, then out of the first water outlet 16 of water outflow disc 2.

Close water flow: when active magnet 24 moves off the end surface of the first controlled magnet 22, the first controlled magnet 22 will lose magnetism, and impelled by the first spring 23 to enable the first mobile sealing pad 19 to move and block the first small hole 18, causing the water in the first inner cavity 12 not to release; with the water flowing in through through-hole 9, the water pressure in the first inner cavity 12 will arise until basically equivalent to the pressure in outer cavity 8; then both the thrusting force of the first spring 23 and the siphon produced by the water flow at water outlet of the first water outflow cavity 14 impel the first valve element 10 and separating sealing pad 7 to move and block the water outlet of outer sealing shell 4, stopping water from flowing out.

When active magnet 24 moves to the end surface of the second controlled magnet 26, it can also produce the action described above in the process of opening water flow, enable water to flow out of the second water outlet 17 of the second water outflow cavity 15 to present another form of water outflow. When active magnet 24 moves off the end surface of the second controlled magnet 26, it can also produce the action described above in the process of closing water flow. By the same token, with the third controlled magnet and other kit or more combination mounted in casing 1, different effects of water outflow will be realized from the shower.

The invention claimed is:

1. An apparatus to control water outflow of a shower head provided in a casing of the shower head that includes a water outflow disc with water outlets, the apparatus comprising:
   a water intake tube including a water intake channel;
   a slide frame including an active magnet installed therein and a switch in connection with the active magnet, the switch being outside of the casing of the shower head, movement of the switch causing the active magnet to slide along the slide frame, the water intake tube connecting with the slide frame;
   an inner sealing shell in connection with the slide frame and including a first groove and a second groove;
   a first spring and a second spring installed within the first groove and the second groove, respectively;

a first controlled magnet and a second controlled magnet in contact with the first spring and the second spring, respectively;

a first mobile sealing pad and a second mobile sealing pad fixed to the first controlled magnet and the second controlled magnet, respectively;

a first valve element and a second valve element in contact with the first mobile sealing pad and the second mobile sealing pad, respectively, the first valve element including a first through hole and a second through hole, the second valve element including a third through hole and a fourth through hole;

a separating sealing pad in contact with the first and second valve elements;

an outer sealing shell located between the separating sealing pad and the water outflow disk;

wherein the inner sealing shell and the outer sealing shell define an intermediate cavity in between and the intermediate cavity communicates with the water intake channel; the outer sealing shell and the water outflow disc define a first water outflow cavity and a second water outflow cavity in between; the first water outflow cavity and the second outflow cavity are separated from each other; the first mobile sealing pad and the first valve element define a first inner cavity; the second mobile sealing pad and the second valve element define a second inner cavity; the first inner cavity and the second inner cavity are separated from each other; the separating sealing pad and the outer sealing shell define an outer cavity in between; the first inner cavity communicates with the first water outflow cavity through the first through hole and communicates with the outer cavity through the second through hole; the first through hole is opened or closed by movement of the first mobile sealing pad; the second inner cavity communicates with the second water outflow cavity through the third through hole and communicates with the outer cavity through the fourth through hole; the third through hole is opened or closed by movement of the second mobile sealing pad; the first and the second water outflow cavity communicate with the water outlets on the water outflow disc; the active magnet cooperates with the first and second controlled magnets to cause compression or expansion of the first and second springs, respectively.

2. The apparatus according to claim 1, wherein the switch can be placed at a close position, a first position where the active magnet aligns with the first controlled magnet and a second position where the active magnet aligns with the second controlled magnet.

* * * * *